United States Patent [19]
Fischer

[11] Patent Number: 5,929,633
[45] Date of Patent: Jul. 27, 1999

[54] DEVICE FOR MEASURING THE THICKNESS OF THIN LAYERS

[76] Inventor: Helmut Fischer, Bergwald 28, D-75391 Gechingen, Germany

[21] Appl. No.: 08/980,855

[22] Filed: Nov. 29, 1997

[30] Foreign Application Priority Data

Nov. 29, 1996 [DE] Germany .......................... 196 49 515

[51] Int. Cl.⁶ .............................. G01B 7/06; G01R 33/12
[52] U.S. Cl. .............................................. 324/230; 33/834
[58] Field of Search ..................... 324/229, 230, 324/231, 72.5, 757, 758; 73/105; 33/832, 834, 558.01, 558.4

[56] References Cited

U.S. PATENT DOCUMENTS 5,053,703  10/1991  Fischer ...................................... 324/230

Primary Examiner—Walter E. Snow

[57] ABSTRACT

The invention relates to a device for measuring the thickness of thin layers in the low micrometer range, having a measuring probe at an end region of a supporting arm, the measuring pole of which probe can be placed on the surface of the layer, having a damping device at the lower end region of the supporting arm, having a bearing device for the supporting arm and having a drive device, which operates using magnetic forces, for the supporting arm, the bearing device comprising a torsion-spring, the two ends of which are each fastened, transversely to the pivot plane, to their own bearing block (32, 33), and the pivoting movement lying at least essentially in the Hooke's range of the torsion-spring (31), and the damping device operating on the principle of eddy-current damping.

28 Claims, 5 Drawing Sheets

DEVICE FOR MEASURING THE THICKNESS OF THIN LAYERS

BACKGROUND OF THE INVENTION

1. Field of the Invention

This invention relates to a device for measuring the thickness of thin layers, and more particularly, to such a device with a light supporting arm having a measuring probe at one end, a damping device at the other end, and a bearing device for the supporting arm. This invention also relates to the measurement method associated with the device and to a circuit for controlling such a device.

2. Discussion of Relevant Art

In some sectors of industry, primarily the automotive industry, very large numbers of items, in the range from 1 to 10 million, are produced. For example, the end faces of nozzles and anchorings of injection valves are chrome-plated. The thickness of the chrome layers must lie within predetermined limits in the range from 3 to 8 $\mu$m. The surfaces to be measured are annular with a typical diameter of 4 mm and a width of 0.5 to 1.5 mm. Components of this kind serve to inject a very precise quantity of fuel in an electronically controlled manner into the engine compartment. This is carried out over an interval whose cycle time has to be predetermined by the timing system. The typical number of stress cycles of the components is about 100 million, corresponding to an engine driving performance of about 160,000 km. If the chrome layers of the components are too small, there is a risk of sticking, i.e. of insufficient fuel passing into the engine compartment. Conversely, if the chrome layer is too thick, there is a risk that the valve will not close and that excessive quantities of fuel will be injected. In this case, there is even a risk of the engine being set on fire, a situation which generally entails manufacturer's liability.

For these reasons, it is necessary to measure these components not merely by random sampling, but also to check that each individual component is kept within the prescribed tolerances. Consequently, the measuring system used for this purpose must have a high resistance to loading, in order to be able continuously to measure the highly sensitive components, which are vital for correct functioning, at an acceptable cost.

Achieving a high service life of the measuring system is difficult in particular when measuring very hard and square-edged crystalline chrome layers.

A further difficulty when measuring thin layers is that there is always a risk when using tactile measuring methods that the layer to be measured may be deformed or altered in some other way during the measurement, resulting in incorrect measurements.

SUMMARY OF THE INVENTION

In view of the above, it is an object of the invention to provide a measuring device that enables the thickness of thin layers to be measured precisely and, at the same time, has a high service life.

This object is achieved according to the invention by a bearing device for a supporting arm having a measuring probe with a measuring pole at one end, a damping device at the other end region of the supporting arm, and a bearing device for the supporting arm having a geometric pivot axis that extends perpendicularly to a geometric pivot plane of the pivoting movement of the supporting arm. A drive for the supporting arm that operates using magnetic forces is arranged symmetrically and, with respect to this pivot plane, the drive includes two permanent magnets that are connected to the supporting arm and have like magnets that lie on either side of the pivot plane. The bearing device includes a torsion spring having two ends fastened to bearing blocks transversely to the pivot plane. The pivoting movement of the tension spring lies at least essentially within the Hooke's range of the torsion spring. The damping device operates by eddy-current damping and includes two electrically conducted metal contact blocks arranged on either side of the pivot plane. Each of the contact blocks has an inner surface directed towards the pivot plane lying opposite to and a short distance from the magnetic poles of the permanent magnets, lying essentially parallel to the pivot plane and intersecting magnetic lines of force. At least one electromagnetic drive coil is located on the outside of the metal contact blocks and is arranged to be triggered via connecting leads.

In operation, the measuring probe arranged on the supporting arm is moved very quickly and in the shortest possible time onto the layer surface by means of the drive device, which operates using magnetic forces. During this movement, the supporting arm is pivoted in the bearing device and the torsion-spring is twisted essentially in the Hooke's range. As a result, the pivoting takes place virtually without friction. The damping device prevents the measuring probe from striking the surface to be measured at high speed. An advantage of eddy-current damping is that there is likewise no mechanical friction, which in particular during the transition from static friction to sliding friction is subject to considerable fluctuations, which would be disadvantageous, in particular immediately before the measuring probe is placed on the layer to be measured, or during this operation. A further advantage of eddycurrent damping is that the damping force decreases as the velocity of the measuring probe decreases, with the result that it is easier to place the measuring probe gently on the layer to be measured.

The drive device is realized by means of an electrical drive coil that responds rapidly and is simple to control.

In view of the high numbers in which injection valves are produced, a further requirement in practice is that the measurement of the layer thickness be carried out with high precision within a short period of time.

It is therefore a further object of the invention to specify a measurement method that on the one hand makes it possible to carry out measurements very quickly and, on the other hand, avoids any changes to the layer to be measured caused by the measurement operation.

In the method according to the invention, first the measuring probe, in an approach phase, is brought at high speed towards the layer to be measured. This has the result that the measuring probe covers most of the distance in a short period of time. As a result, the time that is required overall for the measurement is reduced considerably. However, if the measuring probe were to strike the layer to be measured at this speed, the layer would be damaged.

Therefore, in a following deceleration phase, the movement of the measuring probe is decelerated to such an extent that it is impossible for the layer to be measured to be damaged. In the ideal situation, the measuring probe comes to a standstill precisely when it makes contact with the layer to be measured.

In order to produce defined measurement conditions, and in order to eliminate particles of foreign substances or dust, in the next measurement phase the measuring probe is pressed onto the layer to be measured by a measuring force generated by the operating coils.

The operating cycle of the method is ended by a return phase of the method, during which the measuring probe is returned to its starting position by restoring forces.

In a preferred embodiment, the restoring forces may be generated at least in part by means of the drive coils.

Finally, it is an object of the invention to provide a circuit that makes it possible to carry out the method according to the invention.

This object is achieved by means of a circuit having at least one drive coil from a distance until a measuring pole of the measuring probe is placed onto the surface of the layer. A current supply supplies a current of a predetermined first magnitude to the drive coil. If the current were to continue to be supplied at this first magnitude, the measuring pole would strike the layer with an impact. Therefore, the current supply controls the measuring pole when the measuring probe reaches close to the layer, in such a manner that the current is reduced to a second magnitude that is a fraction of the first magnitude and could include zero. The second magnitude is maintained until the measuring pole is placed on the layer. After that, the current supply supplies a current at a higher, third magnitude that is sufficient for the measuring pole to bear firmly against the layer.

After the measurement operation, the current supply supplies a negative current that accelerates the return of the measuring probe.

BRIEF DESCRIPTION OF THE DRAWINGS

The invention will now be described with reference to the drawings, in which:

FIG. 3b shows a longitudinal section through the holding member on line III—III in FIG. 3a;

DETAILED DESCRIPTION OF PREFERRED EMBODIMENTS

Figure 1A:
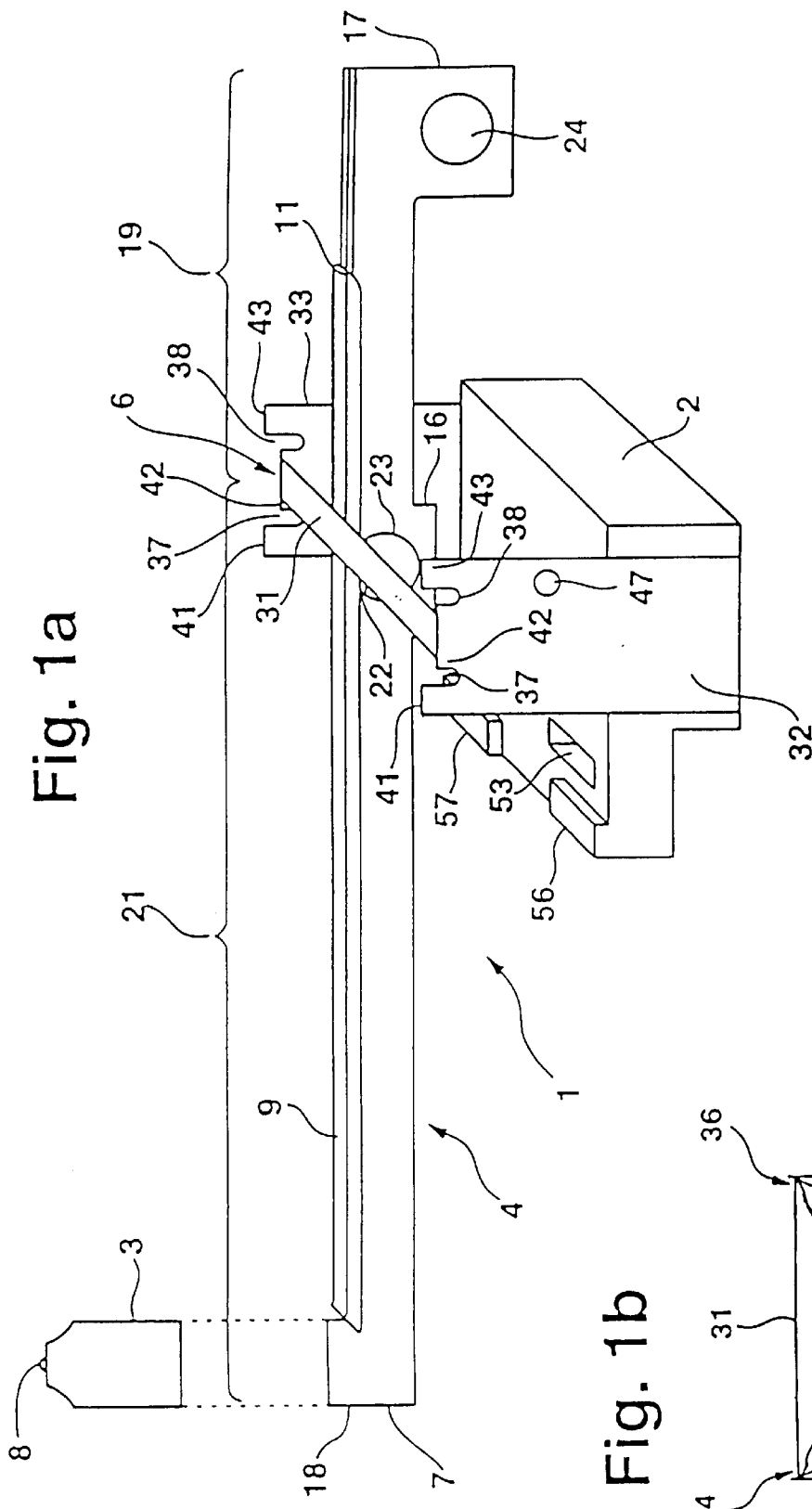
FIG. 1a shows a perspective view of the probe system from the side.

FIG. 1a shows the measuring system, which is denoted overall by 1. The measuring system 1 comprises essentially a base 2, a measuring probe 3, a supporting arm 4 and the bearing arrangement 6 for the latter.

The measuring probe 3, which in operation is placed onto an object with a layer to be measured, is arranged at one end 7 of the elongate supporting bar 4. The measuring probe 3 comprises an exciter winding, which cannot be seen in FIG. 1a, in order to generate an electromagnetic field. The exciter winding surrounds a measuring pole made of a magnetically highly permeable material, the lower end of which protrudes out of the measuring probe 3. A hard pin, which forms a spherical placement surface 8, is accommodated in this end of the measuring probe. Furthermore, an induction winding is wound around the measuring pole. The electromagnetic field generated by the exciter winding changes as a function of the thickness of the layer to be measured beneath the measuring pole. The changes in the magnetic field are measured and evaluated by means of the induction coil. Such a measuring probe 3 is known, for example, from German Patent Document DE-C 34 37 253.

Figure 1B:
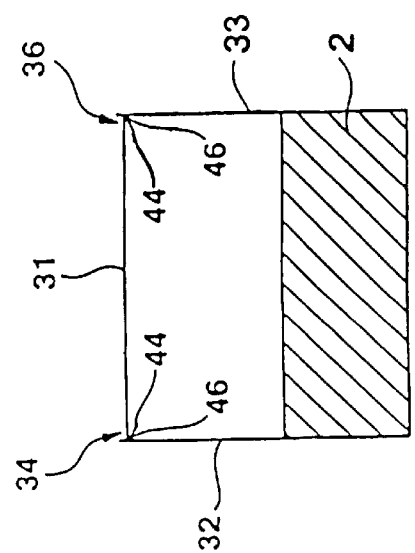
FIG. 1b shows a cross-section through the base and the tensioning brackets of the probe system, without the supporting bar.
Figure 2A:
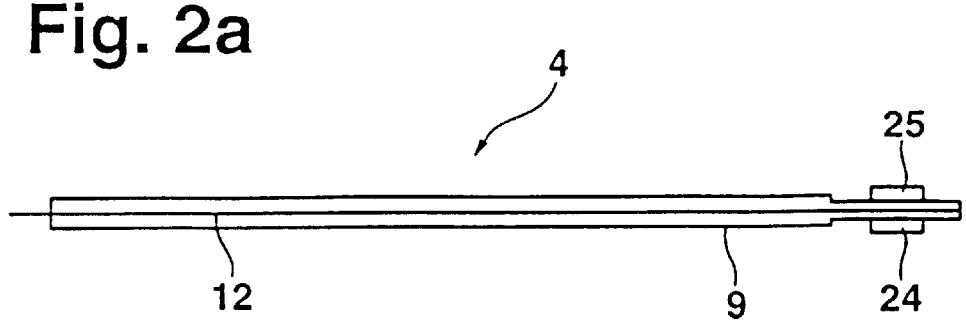
FIG. 2a, 2b show the supporting arm in a plan view from above and in cross-section, on respectively different scales.
Figure 2B:
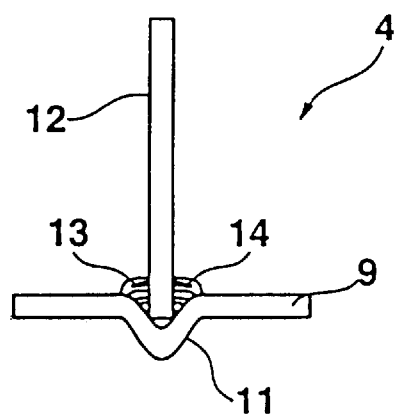

FIGS. 2a and 2b show the supporting arm 4, which is of T-shaped design. A strip of thin spring bronze, which is provided in its centre with a V-shaped groove 11, forms the transverse web 9 of the supporting bar 4. A longitudinal web 12 made of the same material is fitted into the groove 11 and adhesively bonded to the transverse web 9 by two seams of adhesive 13 and 14. The adhesive bonding forms a stable material-to-material bond without significantly increasing the mass of the supporting bar 4. In order to avoid producing stresses in the material during mechanical treatment of the spring bronze, the contour of the transverse web 9 and of the longitudinal web 12 is chemically milled from a foil that has a thickness, for example, of 100 $\mu$m. As shown in FIG. 1a, the longitudinal web 12 has three tab-like widened sections 16, 17 and 18. A first, central tab 16 divides the supporting arm 4 into two sections 19, 21 approximately in the ratio 1:2 and is directed downwards in FIG. 1. The first tab 16 is provided with a through-hole 22, into which a holding member 23 is inserted. The holding member 23 is adhesively bonded to the first tab. The second tab 17 of the longitudinal web 12 of the supporting bar 4 is situated at the end of the short section 19 and, like the first tab 16, is likewise directed downwards in FIG. 1. This tab 17 forms a tongue, on both sides of which is fixedly arranged a flat, cylindrical permanent magnet 24, 25, for example by adhesive bonding (FIG. 2a). The two magnets 24, 25 have a high field intensity of, for example, 1.2 T and their magnet poles are oriented such that two unlike magnet poles lie opposite one another, separated by the tongue. Magnetic field lines emerge from a magnet pole situated on the outside and facing away from the tongue 17, so as to enter back into the second external magnet pole. This results in an axisymmetric magnetic field outside the magnets 24, 25.

A third tab 18 of the longitudinal web 12 is situated at the opposite end of the supporting bar 4. This third tab 18 faces in the direction opposite to the other two tabs 16, 17, i.e. upwards in the figure. In the region of the third tab 18, the longitudinal web 12 protrudes beyond the transverse web 9. It is therefore possible to hold the measuring probe 3 on the third tab 18 without any interference from the transverse web 9. A firm connection is created between the third tab 18 and the measuring probe 3 by adhesive bonding. FIG. 1a diagrammatically shows the measuring probe 3 above the tab 18.

Figure 3A:
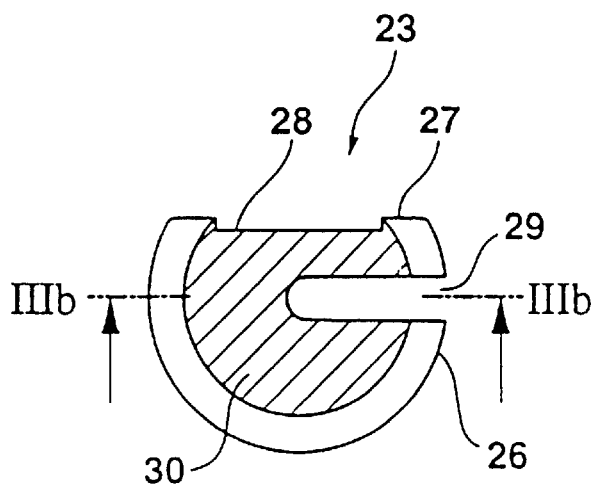
FIG. 3a shows a cross-section through the holding member.
Figure 3B:
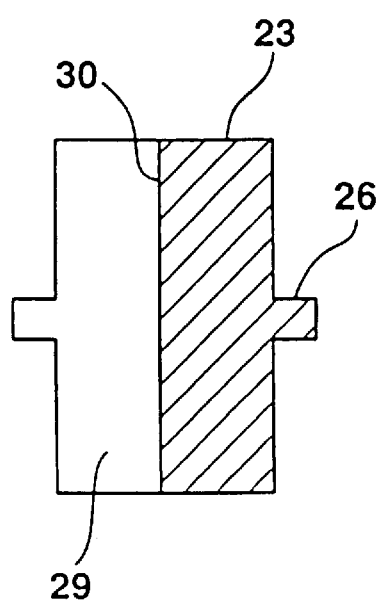

FIGS. 3a and 3b show the holding member 23 in detail. The holding member 23 is provided with a narrow collar 26, which comes into contact with the edge of the through-hole 22, so that the installation position of the holding member 23 is fixed. On the side facing upwards in FIG. 3a, the holding member 23 has a flattened section 27, which is provided with a groove 28 which takes up the entire width of the flattened section 27. Furthermore, the holding member 23 is provided with a radial groove 29, which extends over the entire length of the holding member 23. The groove 29 has a groove base 30, which runs essentially along the centre axis of the holding member 23.

As can be seen from FIG. 1a, a spring strip 31, designed as a tensioning belt, is held in the groove 28 and adhesively bonded to the holding member 23. The spring strip 31 forms a pivot axis for the supporting arm 4, which axis coincides with the centre axis of the holding member 23. In the event the supporting arm 4 is pivoted, the spring strip 31 is twisted, but the torsion always remains within the Hooke's range, so that there is no permanent mechanical friction. As a result, the measurement can take place reproducibly and with a high measurement accuracy. In order to avoid stresses in the spring strip 31, which stresses could arise as a result is of a mechanical treatment during shaping, the spring strip 31 is chemically milled in the correct shape from a foil. A suitable material for the spring strip is copper-beryllium (Cu-Be), with a beryllium proportion of 2%.

It can be seen from FIGS. 1a and 1b that, for this purpose, two tensioning brackets 32, 33, which are designed as leaf springs, are fixedly arranged on two mutually opposite sides of a base 2, for example are screwed to the latter. Unlike the spring strip 31, the tensioning brackets 32, 33, like the supporting arm 4, are made from inexpensive spring bronze. The tensioning brackets 32, 33 extend in the perpendicular direction with respect to the surface of the base 2 and are pre-tensioned outwards with regard to the base 2. At the free ends 34, 36 (FIG. 1b), the tensioning brackets 32, 33 are each provided with two slots 37, 38, so that the tensioning brackets 32, 33 each have three tabs 41, 42 and 43 in this region. The upper region of the respective central tab 42 is bent over inwards sufficiently far for its free end 44 to face downwards, as can best be seen from FIG. 1b. This results in a rounded surface 46 in the central region of the tab 42, over which the spring strip 31 is laid. Advantageously, the central tab 42 is therefore approximately the same width as the spring strip 31, which is bent downwards on both sides as it rests on the tensioning brackets 32, 33. For attachment purposes, the spring strip 31 is, for example, adhesively bonded to the tensioning brackets 32, 33 at a certain distance from the rounded surface 46. This manner of guidance and attachment of the spring strip 31 avoids distortion of the spring strip 31. At the same time, however, the adhesive bonding is such that the spring strip 31 is under a slight tensile stress in its longitudinal direction.

In this way, the supporting arm 4 is mounted resiliently and forms a two-armed lever which can be pivoted about the spring strip 31. The lengths of the lever arms 19, 21 of the supporting bar 4 are selected in such a manner that the supporting arm 4 is counterbalanced. If the supporting arm 4 is pivoted, the spring strip 31 is twisted and generates restoring forces. The restoring forces of the spring strip 31 cause the supporting arm 4 always to return to its horizontal rest position in the event of it being moved. The rounded surface 46 of the central tab 42 ensures that the spring strip 31, when twisted, is not at any point buckled or subjected to some other form of loading which causes friction, notching or additional torsional moments.

The width of the spring strip 31 also ensures suitable guidance of the supporting arm 4 transverse to its longitudinal extent, thus contributing to a high positioning accuracy of the measuring pole. In a different, preferred embodiment the spring strip 31 may be replaced with a torsion wire.

Two electrical connecting leads of the exciter coil and of the induction coil of the measuring probe 3 are guided in pairs to the holding member 23 in the corner regions between the transverse web 9 and the longitudinal web 12. The connecting leads are then guided outwards, away from the supporting arm 4 towards the tensioning brackets 32, 33, in the groove 29 essentially in the centre of the holding member 23. This type of symmetrical guidance of the connecting leads allows a particularly simple and stable attachment of the connecting leads, so that the latter do not move in operation, thus interfering with the equilibrium of the supporting arm 4 or creating friction. Moreover, in the event the supporting arm 4 is pivoted, the connecting leads are practically not moved at all, because they coincide almost exactly with the pivot axis. Furthermore, the connecting leads, owing to the immediate proximity to the pivot axis and owing to the associated, extremely short active lever arm, are unable to exert any torque on the supporting arm 4, which could perceptibly affect the supporting arm 4. Finally, the connecting leads lead from the holding member 23, through an opening 47 in each tensioning bracket 32, 33, for example to a terminal.

The current intensities for the measuring probe may be selected such that, for example, line cross-sections of $4 \times 10^{-4}$ mm$^2$ are sufficient. In principle, it is also possible to supply the current via etched conductor tracks which are adhesively bonded to the supporting arm 4 by means of an insulating intermediate film. In this way, the weight of the supporting arm 4 can be reduced still further and production can be simplified.

Figure 4A:
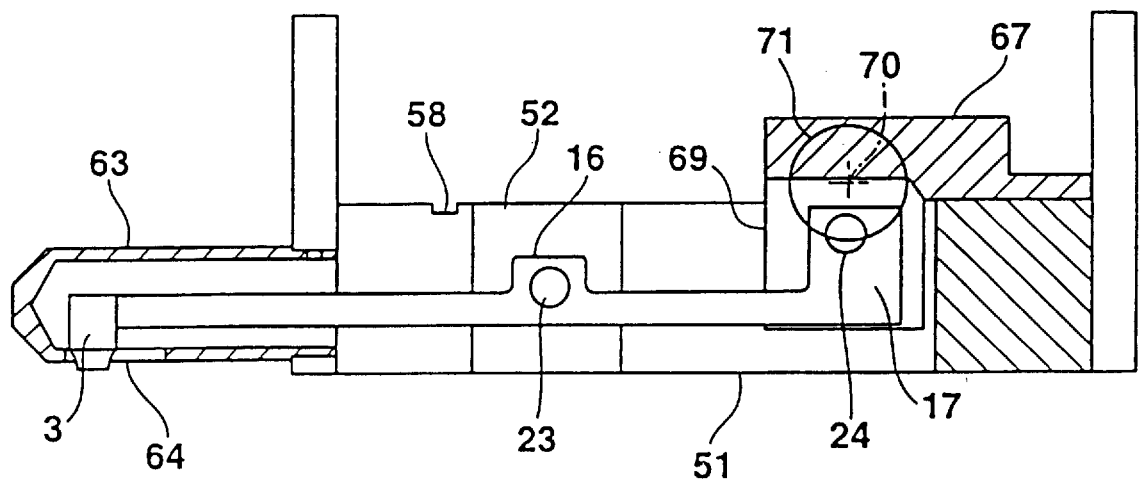
FIG. 4a shows a diagrammatic view of the measuring device from the side, partially in cross-section.

FIG. 4a shows the measuring system 1 incorporated in a rectangular bottom part 51. For the sake of clarity, the bearing arrangement 6 for the supporting arm 4, which comprises the base 2 and the tensioning brackets 32, 33, has been omitted. In this connection, the bottom part 51 has an essentially rectangular aperture 52, which is dimensioned such that, on the one hand, the tensioning brackets 32, 33 can be accommodated with an intermediate space at the sides and, on the other hand, the base 2 engages over the aperture 52. The base 2 is provided with two elongate holes, of which only one is visible, indicated by the reference numeral 53, so that the base 2 can be adjusted on the bottom part 51 in the transverse direction. On the side which faces the bottom part 51 in the installed position, the base 2 bears two rectangular, shallow projections 56, 57, which engage in a transverse groove 58 in the bottom part 51. In this way, it is impossible to rotate the base 2 on the bottom part 51. At the same time, the precise position thereof in the longitudinal direction is fixed.

Figure 4B:
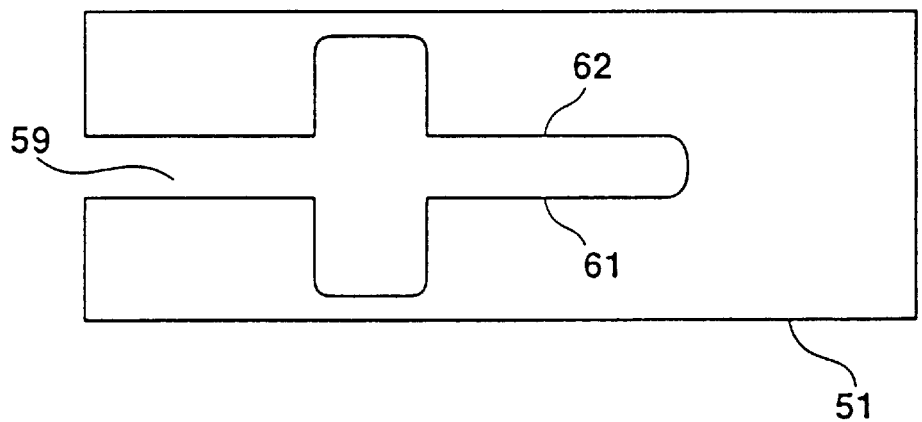
FIG. 4b shows a diagrammatic view of the bottom part of the measuring device from below.

FIG. 4b shows the bottom part 51 in a view from below. The bottom part 51 is provided with a slot 59 for the supporting arm 4, which slot is sufficiently long for the supporting arm 4 to be pivotable therein. The width of the slot 59 is dimensioned in such a way that the supporting arm 4 does not come into contact with the side walls 61, 62 of the slot 59 even when the full extent of the adjustability of the base 2 along its elongate holes exploited.

Figure 4C:
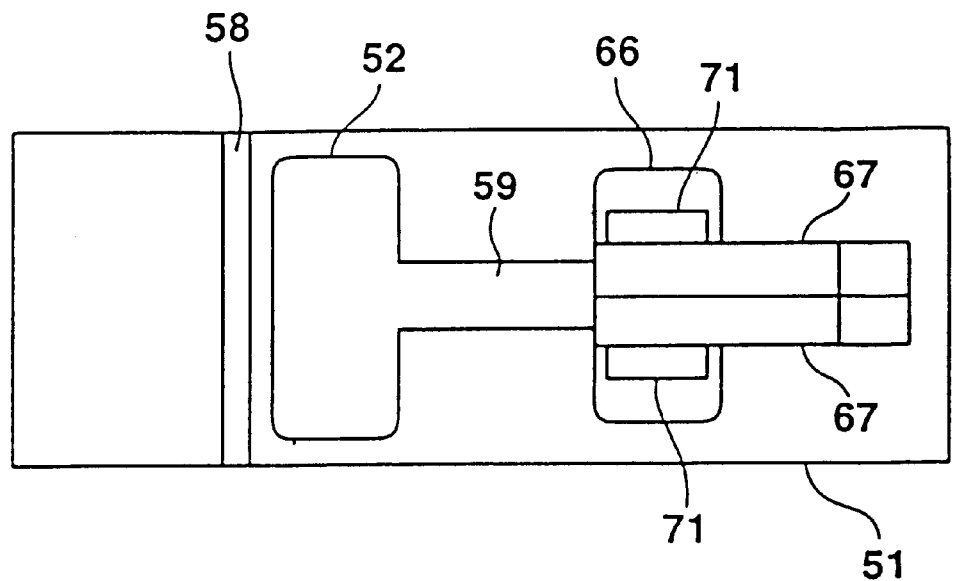
FIG. 4c shows a diagrammatic view of the measuring device in a view from above.

The supporting arm 4, by means of its arm 21 which bears the measuring probe 3, projects beyond the bottom part 51 and is protected from mechanical damage by a sleeve 63 which is closed at the end. The sleeve 63 has a measuring opening 64, through which the measuring probe 3 can pass when the supporting arm 4 is moved. As can be seen from FIG. 4c, an elongate recess 66 is provided parallel to the aperture 52 in the bottom part 51, in which recess are inserted two identical L-shaped damping plates 67.

For the sake of clarity, the measuring system is not shown in this figure.

A drive coil 71 is arranged on each outer side of the wide limb 69 of each damping plate 67. The two drive coils 71 of the two damping plates 67 are arranged concentrically with one another when the damping plates 67 are installed in the recess 66. If a direct current flows through the drive coils 71, an axisymmetric, temporally unchangeable magnetic field is produced, as for permanent magnets. The joint axis of symmetry 70 (FIG. 4a) of the drive coils 71 is offset, in the installed position, with respect to the axis of symmetry of the permanent magnets 24, 25, in such a manner that the respective magnetic fields at least partially overlap and, in the event of the polarity of the magnetic fields being the same, lead to an attraction between them. The attraction force moves the supporting arm 4, with the result that the measuring probe 3 moves towards the surface to be measured.

Figure 5:
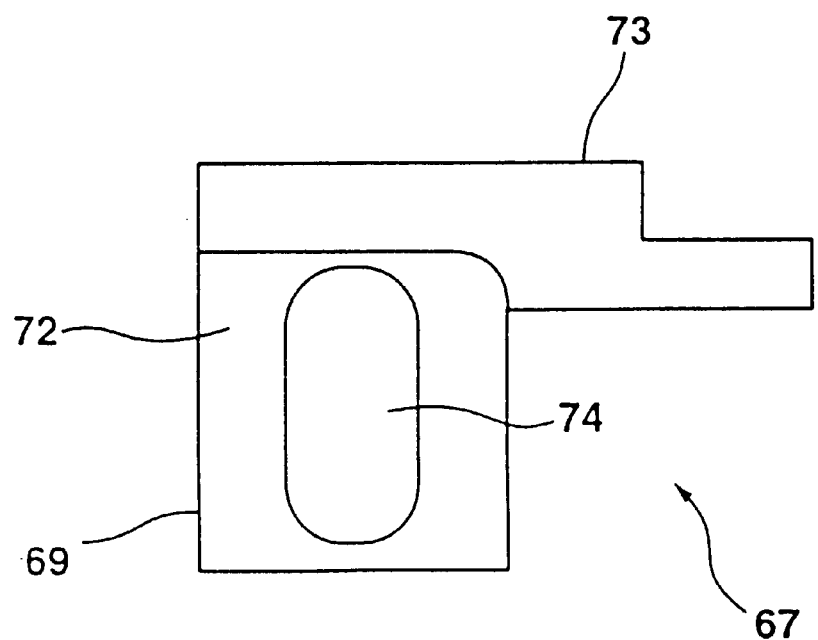
FIG. 5 shows a plan view of the inside of a damping plate.

FIG. 5 shows the inner side 72 of one of the damping plates 67, in plan view. The damping plate 67 has a wide limb 69 and a narrow limb 73, the thickness of the wide limb 69 being less than that of the narrow limb. Moreover, a trough-like recess 74 is arranged in the centre of the wide limb 69. The wide limbs 69 of the two damping plates 67 project into the recess 66 of the bottom part 51. The narrow and thicker limbs 73 bear against one another, so that, owing to the smaller dimensions of the wide limbs 69, there is a gap between the latter. Into this gap projects that region of the supporting arm 4 at which the transverse web 9 is narrowed to the width of the groove 11. In the mounted position, the permanent magnets 24, 25 are freely movable in the space which is formed by the two trough-like recesses 74 in the wide limbs 69 of the damping plates 67, the gap formed therebetween being as small as possible, so that as few force lines as possible run in the air gap.

The damping plates 67 interact with the permanent magnets 24, 25 to form an eddy-current damping for the supporting arm 4, the damping plates 67 being fixedly arranged on the measuring system 1. The eddy-current damping is based on the principle that electric currents are induced by a relative movement between a magnetic field and an electrical conductor. The electric currents are directed in such a manner that they generate deceleration forces which are directed oppositely to the said relative movement. The deceleration forces bringing about the damping of the relative movement increase as the electrical conductivity of the electrical conductors through which the magnetic field passes increases. For this reason, according to the invention the damping plates 76 are made from electrolytic copper, which is distinguished by a particularly high electrical conductivity.

It is necessary to damp the movement of the supporting arm 4, because the latter is suspended from the spring strip 31 without friction. Once attracted by the drive coils 71, without damping the measuring probe 3 would strike the layer to be measured without any deceleration and would damage this layer. However, mechanical damping is unsuitable, since damping produced in this way is subject to excessive fluctuations. Furthermore, the transition from static friction to sliding friction, with extremely different coefficients of friction, presents difficulties during the measurement, for example if the measuring probe 3 is already situated very close to the surface to be measured. A particular advantage of eddy-current damping is that the damping force disappears when the measuring probe 3 is at rest. The present design, in which the permanent magnets 24, 25 are arranged on the supporting arm 4 and are movable with respect to the stationary damping plates 67, provides maximum possible efficiency of the eddy-current damping combined with the minimum possible mass of the supporting arm 4.

If the device is to be operated in a corrosive environment, it is readily possible to gold-plate the copper plates without impairing the functioning of the eddy-current damping.

It is also desirable from the damping aspect that the moving mass of the probe system 1 be as low as possible, so that the kinetic energy of the latter be as low as possible, leading to rapid deceleration with the given damping action.

In one preferred embodiment of the invention, the mass is about 0.5 g; reducing the mass further would bring few advantages with regard to the requirements set. It is much more effective to reduce the velocity of the measuring system at the instant at which the measuring probe is placed on the layer to be measured. It is known that the kinetic energy depends on the square of the velocity, but only on the first power of the mass.

The bottom part 51 is connected to further housing parts, of which only two end plates 76, 77 are illustrated. In this way, the entire device is protected from environmental influences and mechanical damage.

Figure 6A:
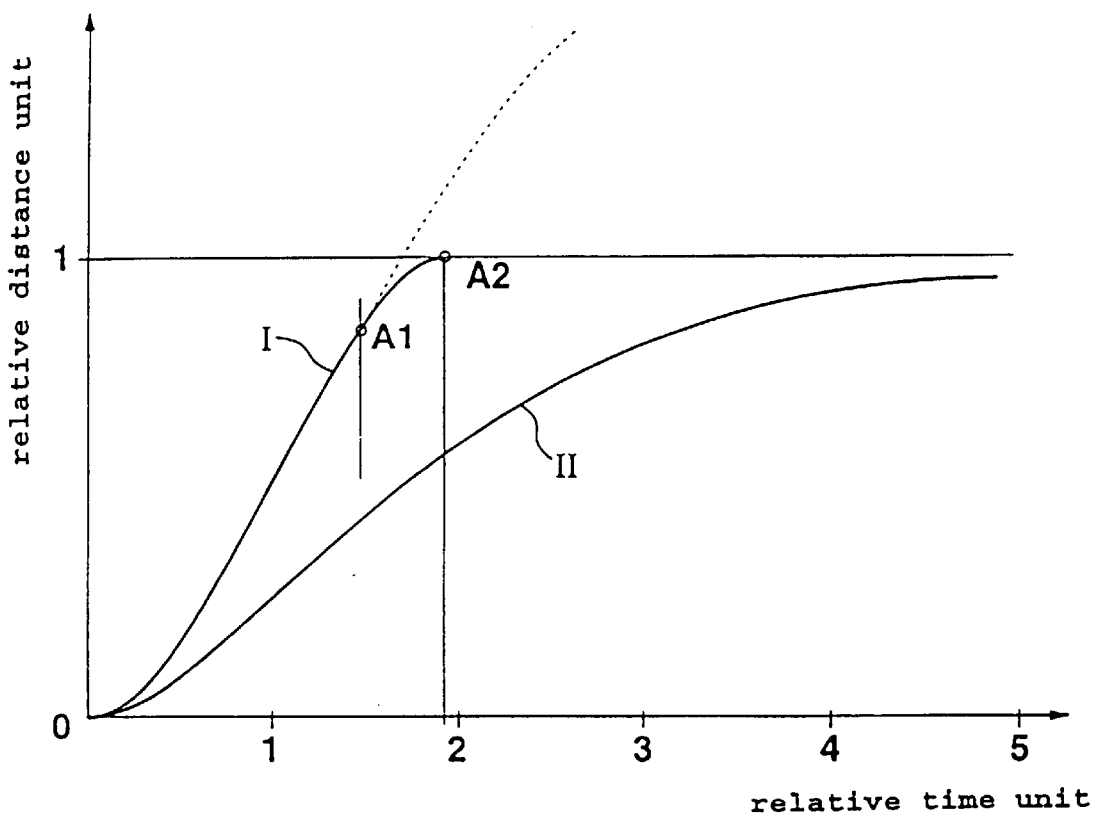
FIG. 6a shows the travel of the probe system plotted against relative time units.
Figure 6B:
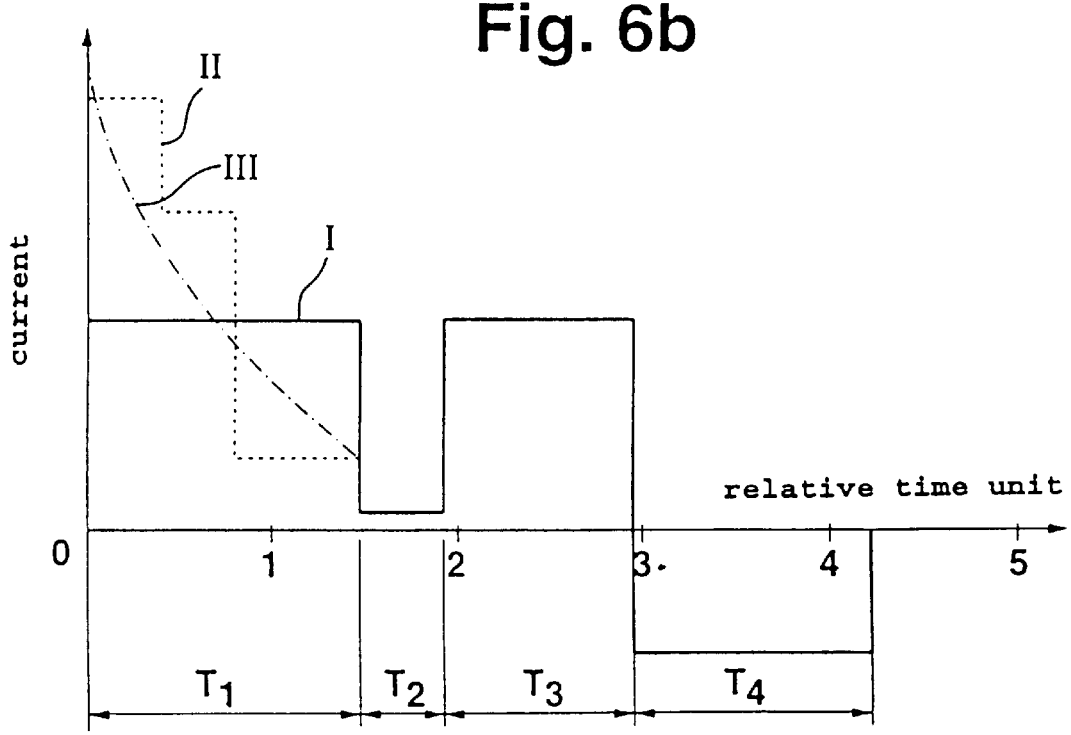
FIG. 6b shows the control voltage for the drive coils plotted against relative time units.

The device described thus far functions as follows: A layer-thickness measurement is carried out in a number of steps which are illustrated in FIG. 6a and 6b. FIG. 6a shows the distance covered by the measuring probe 3 in relative distance units plotted against relative time units. The relative distance unit 0 indicates a position of the measuring probe 3 in which the layer to be measured no longer has any effect on this probe. The relative distance unit 1 indicates the position of the layer to be measured. FIG. 6b illustrates the associated temporal curve of the current passing through the drive coils 71.

a) During a first time interval $T_1$, a high current is sent through the drive coils 71, in order to accelerate the supporting arm 4 strongly and in order to bring the the measuring probe 3 towards the layer to be measured at high speed. The distance covered by measuring probe 3 is illustrated in FIG. 6a as a solid line I. In high-resolution probes, the measuring probe 3 is situated at a distance, for example, of 1 mm from the measurement site. For probes with a less high resolution, the distance from the measurement site may be 2 mm, in which case the time from the infinite point (measuring probe in the starting position) to the object to be measured is only insignificantly greater. At the end of the time interval T1, the measuring probe 3 is situated at the site A1, extremely close to the layer to be measured. If the coil current were to maintain this intensity, the measuring probe 3 would strike the layer at high speed, as indicated by the dotted line. In this event, the layer to be measured would be damaged and the measuring pole would quickly be worn away.

b) For this reason, in the course of a second time interval $T_2$ the coil current is reduced to a considerably lower value, or even to zero. The supporting arm 4 is now decelerated considerably under the influence of the eddy-current damping and the increasing restoring force of the spring strip 31. The nature of the eddy-current damping means that the damping decreases with the velocity, and leads to the measuring probe 3 being placed gently on the layer at a very low velocity. The instant at which this positioning takes place is indicated by the point A2 in FIG. 6a. At this point, the low, moving mass of the probe system 1 also has a beneficial effect: at the low positioning velocity, the kinetic energy of the probe system 1 is so low that the layer cannot be damaged and the measuring pole is preserved.

c) Then, during a third time interval $T_3$, the coil current is increased again, for example to the original level, in order to generate a defined pressure for the measuring probe 3. The pressure is sufficiently high for a very good reproducibility of the measurement to be achieved but sufficiently low for there to be no deformation of the layer. At the same time, the pressure is able to push aside any particles. During the time interval $T_3$, the layer thickness is measured, in a manner known per se, by an inductive method.

d) After the end of the measurement, the measuring probe 3 is removed again from the measured object. This is achieved, on the one hand, by means of the restoring force of the spring strip 31 and, on the other hand, by reversing the direction of the coil current, leading to repulsion between the drive coils 71 and the permanent magnets 24, 25. It is clear from the individual steps of carrying out the layer-thickness measurement that the velocity, particularly when the probe is placed on the layer to be measured, is kept as low as possible. It is evident that this is made possible essentially because of the very low mass of the overall system, with the result that the inertia of the system can be considerably reduced.

This device makes it possible to perform ten measurements per second while providing maximum protection for the measuring pole and the layer to be measured. For comparison purposes, the solid line II in FIG. 6a also plots the case of aperiodic damping of the supporting arm 4. In this case, the measuring probe 3 approaches the surface asymptotically, so that the measuring pole is placed on the surface at zero velocity. This is the optimum scenario with regard to protecting the surface and the measuring pole. However, it takes considerably longer than in the embodiment described previously to bring the measuring probe onto the surface, so that the number of measurements possible per unit time is correspondingly reduced.

Naturally, the coil current shown in FIG. 6b may also have a curve which is different from that which is illustrated by the solid line I. For example, the coil current may be stepped (dashed line II) or may have a continuous curve (dot-dashed line III).

It is also conceivable to decelerate the measuring probe 3 by reversing the current direction in the drive coils 71. However, this requires the instant at which the polarity is reversed to be precisely defined and observed. Even very slight shifts in the instant at which the deceleration action sets in would lead to the measuring pole being placed on the layer in an uncontrolled manner. This would lead to increased wear of the measuring pole, to damage to the layer to be measured, and to poor measurement reproducibility.

If, after a very great number of, for example, 4 million measurements, the measuring probe has become worn, it can be replaced by a new one. The other components of the device operate virtually without wear and can still be operated for a much longer period.

What is claimed is:

1. Device for measuring thickness of thin layers in a low micrometer range, comprising:
    a light supporting arm,
    a measuring probe at one end region of said supporting arm, having a measuring pole arranged to be placed on a surface of a layer after a pivoting movement,
    a damping device at the other end region of said supporting arm,
    a bearing device for said supporting arm, having a geometric pivot axis that extends perpendicular to a geometric pivot plane of said pivoting movement of said supporting arm, and
    a drive for said supporting arm that operates using magnetic forces, and is arranged symmetrically with respect to said pivot plane and includes two permanent magnets that are connected to said supporting arm and have like magnetic poles that lie on either side of said pivot plane, wherein:
    said bearing device (6) comprises a torsion-spring (31) having two ends fastened to bearing blocks (32, 33) trasversely to said pivot plane,
    pivoting movement of said tension-spring (31) lies at least essentially within a Hooke's range of said torsion-spring (31),
    said damping device operates by eddy-current damping and comprises two electrically conductive metal contact blocks (67) arranged on either side of said pivot plane, each of said contact blocks having an inner surface (72) directed towards said pivot plane, lying opposite to and at a short distance from said magnetic poles of said permanent magnets (24, 25), lying essentially parallel to said pivot plane and intersecting magnetic lines of force, and
    at least one electromagnetic drive coil (71) on the outside of said metal contact blocks (67) and arranged to be triggered via connecting leads.

2. Device according to claim 1, wherein at least one of said two bearing blocks (32, 33) comprises a tensioning bracket (32, 33) that places said torsion-spring (31) under tensile stress in its longitudinal direction.

3. Device according to claim 1, wherein said torsion-spring (31) comprises a metal foil strip (31).

4. Device according to claim 3, wherein said foil strip (31) extends essentially transversely to a longitudinal extension of a transverse web (9) of said supporting arm.

5. Device according to claim 3, wherein said foil strip (31) is at least essentially free of internal stresses.

6. Device according to claim 3, wherein said foil strip (31) has a chemically milled contour.

7. Device according to claim 1, wherein said supporting arm (4) comprises a transverse web (9) that extends at least essentially perpendicular to said pivot plane and a longitudinal web (12) that extends at least essentially parallel to said pivot plane and has a longitudinal edge that butts against and is integrally attached without stresses to a centre of said transverse web (9).

8. Device according to claim 7, wherein at least one of said webs (9, 12) was chemically milled without stresses.

9. Device according to claim 1, wherein said bearing device (6) comprises a pair of leaf springs (32, 33) that are bent outwards for prestressing said torsion spring (31) and have free end regions to which a respective end region of said torsion spring (31) is attached at least indirectly.

10. Device according to claim 9, wherein at least one leaf spring of said pair of leaf springs (32, 33) is bent off in its free end region (34, 36) in an L-shape to form a rounded surface (46), and said torsion spring (31) runs above said free L-shaped end region around said rounded surface (46) and is attached to said leaf springs (32, 33) at a relatively great distance from said rounded surface (46).

11. Device according to claim 10, wherein said rounded surface (46) has a constant radius that extends parallel to said pivot axis of said bearing device and is a bending radius.

12. Device according to claim 3, wherein said supporting arm (4), in a region of said foil strip (31), has a projecting tab (16) across which said foil strip (31) passes in one piece.

13. Device according to claim 3, further comprising a holding member (23) rigidly attached to said supporting arm (4) and having a groove (28) that holds said foil strip (31) in an unstressed position.

14. Device according to claim 13, wherein connecting leads of said measuring probe (3) are attached to said supporting arm and are guided out through at least one radial groove (29) in said holding member (23) close to said pivot axis of said bearing device.

15. Device according to claim 3, wherein said foil strip (31), in its torsion region, is unconnected to said connecting leads.

16. Device according to claim 7, wherein said connecting leads of said measuring probe (3) are adhesively bonded to said longitudinal web (12) symmetrically with respect to said longitudinal web (12).

17. Device according to claim 16, wherein location of said adhesion bonding is situated in a corner region between said transverse web (9) and said longitudinal web (12).

18. Device according to claim 7, wherein said transverse web (9) has a V-shaped groove (11) in its central longitudinal region that accommodates said longitudinal edge of a longitudinal web (12).

19. Device according to claim 3, wherein said pivoting movement of said supporting arm (4) lies in a starting range of said Hooke's range of said metal foil strip (31).

20. Device according to claim 1, wherein said permanent magnets (24, 25) are attached to a tongue (17) of said supporting arm (4), which tongue lies precisely in said pivot plane of said supporting arm (4).

21. Device according to claim 20, wherein said tongue (17) is an integral part of a longitudinal web (12) of said supporting arm (4).

22. Device according to claim 1, wherein said metal contact blocks (67) have trough-like recesses (74) with peripheral faces that at least partially accommodate said permanent magnets (24, 25) and form a cage for field lines of said permanent magnets (24, 25).

23. Device according to claim 1, wherein at least one of said drive coils (71) is displaced towards a rest position of said permanent magnets (24, 25) in a direction of said pivoting movement.

24. Device according to claim 1, wherein coercive force of said permanent magnets (24, 25) is significantly greater than field intensity of said at least one drive coil (71).

25. Method for measuring thickness of a thin layer using an electrical method, in which, for measurement purposes, a measuring probe is placed on the layer to be measured, comprising:

in an approach phase, bringing said measuring probe (3) out of a starting position at a great speed towards the layer to be measured, in a deceleration phase, decelerating said measuring probe (3) to a speed at which said measuring probe (3) is placed on said layer and adopts a measuring position, said speed at which said measuring probe (3) is placed on said layer being so low that there is no possibility of said layer being damaged, in a measurement phase, increasing pressure of said measuring probe (3) in said measuring position on said layer, and in a return phase, returning said measuring probe (3) to said starting position by restoring forces.

26. Method according to claim 25, further comprising producing said restoring forces at least in part by an interaction between a magnetic field of permanent magnets (24, 25) and at least one drive coil (71).

27. Circuit for controlling a device for measuring thin layers in a low micrometer range, comprising:

at least one drive coil (71) for moving a measuring probe (3) from a distance at which a layer to be measured has no effect on said measuring probe (3) until a measuring pole (8) of said measuring probe (3) is placed onto a surface of said layer, and a current supply supplying a current of a predetermined first magnitude to said at least one drive coil (71), which current, if it were to continue to be supplied at said first magnitude, would lead to said measuring pole (8) striking said layer with an impact, said current supply controlling said measuring pole (8), when said measuring probe (3) reaches close to said layer in such a manner that said current is reduced to a second magnitude including zero that is a fraction of said first magnitude, said current supply maintaining said second magnitude until said measuring pole (8) is placed on said layer, and after said measuring pole (8) is placed on said layer, said current supply supplies a current at a higher, third magnitude that is sufficient to bear said measuring pole (8) firmly against said layer to be measured.

28. Circuit according to claim 27, wherein after a measurement operation said current supply supplies a negative current that accelerates a return of said measuring probe (3).

* * * * *